United States Patent
Ishida et al.

(10) Patent No.: US 8,753,214 B2
(45) Date of Patent: Jun. 17, 2014

(54) GAME DEVICE, METHOD FOR CONTROLLING GAME DEVICE, PROGRAM AND INFORMATION MEMORY MEDIUM

(75) Inventors: Zenta Ishida, Tochigi (JP); Ryuma Hachisu, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 117 days.

(21) Appl. No.: 13/259,852

(22) PCT Filed: Sep. 16, 2009

(86) PCT No.: PCT/JP2009/066196
§ 371 (c)(1),
(2), (4) Date: Dec. 16, 2011

(87) PCT Pub. No.: WO2010/109695
PCT Pub. Date: Sep. 30, 2010

(65) Prior Publication Data
US 2012/0142435 A1    Jun. 7, 2012

(30) Foreign Application Priority Data

Mar. 26, 2009  (JP) .................................. 2009-077652

(51) Int. Cl.
*A63F 13/00*    (2014.01)
(52) U.S. Cl.
USPC .................. 463/43; 463/30; 463/32; 463/34; 463/44
(58) Field of Classification Search
USPC .................... 463/30, 32, 34, 43, 44
See application file for complete search history.

(56) References Cited

U.S. PATENT DOCUMENTS

| 6,439,999 | B1 | 8/2002 | Matsuzawa |
| 2001/0001091 | A1 | 5/2001 | Asai et al. |
| 2010/0105464 | A1* | 4/2010 | Storm et al. ..................... 463/20 |

(Continued)

FOREIGN PATENT DOCUMENTS

| EP | 0 512 861 A2 | 11/1992 |
| EP | 0 836 873 A1 | 4/1998 |

(Continued)

OTHER PUBLICATIONS

Taiwanese Office Action corresponding to Taiwanese Patent Application No. 98141825, dated Oct. 16, 2012.

(Continued)

*Primary Examiner* — James S. McClellan
*Assistant Examiner* — Shahid Kamal
(74) *Attorney, Agent, or Firm* — Sughrue Mion, PLLC

(57) ABSTRACT

A game device is provided. The game device includes a first execution section, a game screen updating section, and a game situation data acquiring section. In the case where a first execution time which comes every first time period is reached, the first execution section generates game situation data. In the case where a second execution time which comes every second time period is reached, the game screen updating section updates a game screen based on game situation data corresponding to an attention time which comes a time period before the second execution time. The game situation data acquiring section acquires the game situation data corresponding to the attention time by executing interpolation processing based on first game situation data corresponding to a time which comes before the attention time and second game situation data corresponding to a time which comes after the attention time.

7 Claims, 10 Drawing Sheets

(56) References Cited

U.S. PATENT DOCUMENTS

| | | |
|---|---|---|
| 2010/0184495 A1* | 7/2010 | Levy et al. .................. 463/4 |
| 2010/0216549 A1* | 8/2010 | Salter ....................... 463/31 |
| 2011/0269548 A1* | 11/2011 | Barclay et al. ............ 463/42 |
| 2012/0172101 A1* | 7/2012 | Lutnick et al. ............ 463/12 |
| 2012/0214575 A1* | 8/2012 | Amaitis et al. ............ 463/25 |

FOREIGN PATENT DOCUMENTS

| | | |
|---|---|---|
| JP | 4-334193 A | 11/1992 |
| JP | 9-215858 A | 8/1997 |
| JP | 10-020825 A | 1/1998 |
| JP | 2001-046747 A | 2/2001 |
| JP | 2002-197480 A | 7/2002 |
| JP | 2006-164168 A | 6/2006 |

OTHER PUBLICATIONS

European Search Reported dated Feb. 21, 2013 issued in European Patent Application No. 09 84 2305.6.

\* cited by examiner

FIG.14

| AUDIO ID | AUDIO DATA | SITUATION |
|---|---|---|
| 1 | "PASS!" | PASS HAS BEEN MADE |
| 2 | "SHOT!" | SHOT HAS BEEN MADE |
| 3 | "GOAL!" | GOAL HAS BEEN SCORED |
| ... | ... | ... |

FIG.15

AUDIO ID:10,
SOUND LEVEL:5, ...

AUDIO ID:3,
SOUND LEVEL:10, ...

FIG.16

AUDIO ID:30,
SOUND LEVEL:5, ...

AUDIO ID:15,
SOUND LEVEL:8, ...

AUDIO ID:10,
SOUND LEVEL:5, ...

AUDIO ID:8,
SOUND LEVEL:5, ...

AUDIO ID:3,
SOUND LEVEL:10, ...

$Q[TA_{n-1}]$  $Q[TA_n]$

GAME DEVICE, METHOD FOR CONTROLLING GAME DEVICE, PROGRAM AND INFORMATION MEMORY MEDIUM

TECHNICAL FIELD

The present invention relates to a game device, a method of controlling a game device, a program, and an information storage medium.

BACKGROUND ART

In a game device, processing is executed every predetermined time period. For example, the processing to be executed every predetermined time period in the game device includes processing of updating game situation data indicating the situation of a game and processing of updating a game screen based on the updated game situation data. For example, in the case of a game device for executing a sport game in which a moving object (for example, ball or puck) is used, the following items of processing are alternately executed. Those items of processing are processing of updating state data indicating the state (for example, position) of a player character or a moving object and processing of updating the game screen based on the updated state data of the player character or the moving object.

In general, the interval at which processing is executed in the game device is set in accordance with the system of a display device for displaying the game screen. For example, in a case where the game screen is displayed on a television set compliant with the National Television System Committee (NTSC) system, the processing is executed every $\frac{1}{60}^{th}$ of a second (or $\frac{1}{30}^{th}$ of a second). On the other hand, for example, in a case where the game screen is displayed on a television set compliant with the Phase Alternating Line (PAL) system, the processing is executed every $\frac{1}{50}^{th}$ of a second (or $\frac{1}{25}^{th}$ of a second).

PRIOR ART DOCUMENT

Patent Document

[Patent Document 1]: JP 2006-164168 A

DISCLOSURE OF THE INVENTION

Problems to be Solved by the Invention

In a case where a game (game program) is made compatible with a plurality of game devices having different processing execution intervals, the following points need to be noted. For example, in a case where a game is made compatible with both a game device A, which executes processing every $\frac{1}{60}^{th}$ of a second, and a game device B, which executes processing every $\frac{1}{50}^{th}$ of a second, the following points need to be noted.

Here, the following case is assumed. That is, the amount of movement of a game character moving in a given direction, which is obtained each time the processing is executed once (in other words, every one frame), is represented by V in both the game devices A and B. In this case, in the game device A, the amount of movement of the game character per second is 60*V (*: multiplication operator), whereas in the game device B, the amount of movement of the game character per second is 50*V. In other words, the amount of movement of the game character per second is larger in the game device A than in the game device B. As a result, there may arise such an inconvenience that, despite the same game software, the difficulty level of the game varies depending on the game device in use. Further, for example, in a case where the user of the game device A and the user of the game device B play against each other via a communication network, because of the fact that the amount of movement of the game character per second varies between the game devices A and B, there may arise inconsistency in game situation between the game devices A and B, or there may arise inequality between the users.

Thus, in developing such a game (game program) as described above, a game developer needs to adjust the amount of movement of the game character, which is obtained each time the processing is executed once, so that the amount of movement of the game character per second does not vary between the game devices A and B. Consequently, the workload of the game developer increases.

The present invention has been made in view of the above-mentioned problem, and an object thereof is to provide a game device, a method of controlling a game device, a program, and an information storage medium, which are capable of reducing a workload of a game developer in developing a game (game program) compatible with a plurality of game devices having different processing execution intervals.

Means for Solving the Problems

In order to solve the above-mentioned problem, the present invention provides a game device including: first execution means for executing generation of game situation data indicating a situation of a game in the case where a first execution time which comes every first time period is reached; game situation data storage means for storing a plurality of pieces of the game situation data generated by the first execution means; and second execution means for executing output control regarding the game in the case where a second execution time which comes every second time period is reached, in which: the second execution means includes game screen updating means for updating, in the case where the second execution time is reached, a game screen based on game situation data corresponding to an attention time which comes a predetermined time period before the second execution time; the game situation data storage means stores at least first game situation data corresponding to a time which comes before the attention time and second game situation data corresponding to a time which comes after the attention time; and the game screen updating means includes: game situation data acquiring means for acquiring the game situation data corresponding to the attention time by executing interpolation processing based on the first game situation data and the second game situation data; and means for updating the game screen based on the game situation data acquired by the game situation data acquiring means.

The present invention also provides a method of controlling a game device, including: a first execution step of executing generation of game situation data indicating a situation of a game in the case where a first execution time which comes every first time period is reached; a step of referring to a storage content of game situation data storage means storing a plurality of pieces of the game situation data generated in the first execution step; and a second execution step of executing output control regarding the game in the case where a second execution time which comes every second time period is reached, in which: the second execution step includes a game screen updating step of updating, in the case where the second execution time is reached, a game screen based on game situation data corresponding to an attention time which comes a predetermined time period before the second execution time; the game situation data storage means stores at least first game situation data corresponding to a time which comes before the attention time and second game situation data corresponding to a time which comes after the attention time; and the game screen updating step includes: a game situation data acquiring step of acquiring the game situation data corresponding to the attention time by executing interpolation processing based on the first game situation data and the second game situation data; and a step of updating the game screen based on the game situation data acquired in the game situation data acquiring step.

The present invention further provides a program for causing a computer including, for example, a consumer game machine (stationary game machine), a portable game machine, an arcade game machine, a mobile phone, a personal digital assistant (PDA), or a personal computer, to function as a game device, the program further causing the computer to function as: first execution means for executing generation of game situation data indicating a situation of a game in the case where a first execution time which comes every first time period is reached; means for referring to a storage content of game situation data storage means storing a plurality of pieces of the game situation data generated by the first execution means; and second execution means for executing output control regarding the game in the case where a second execution time which comes every second time period is reached, in which: the second execution means includes game screen updating means for updating, in the case where the second execution time is reached, a game screen based on game situation data corresponding to an attention time which comes a predetermined time period before the second execution time; the game situation data storage means stores at least first game situation data corresponding to a time which comes before the attention time and second game situation data corresponding to a time which comes after the attention time; and the game screen updating means includes: game situation data acquiring means for acquiring the game situation data corresponding to the attention time by executing interpolation processing based on the first game situation data and the second game situation data; and means for updating the game screen based on the game situation data acquired by the game situation data acquiring means.

The present invention further provides a computer-readable information storage medium storing the above-mentioned program.

According to the present invention, it is possible to reduce the workload of the game developer in developing a game (game program) compatible with a plurality of game devices having different processing execution intervals.

Further, according to an aspect of the present invention, the first execution means may include: means for executing, in the case where the first execution time is reached, generation processing of generating the game situation data and determination processing of determining, based on the situation of the game, a content of the output control to be executed by the second execution means; and means for causing instruction data storage means to store output instruction data for instructing the second execution means to execute the output control having the content determined in the determination processing. The second execution means may include means for executing the output control based on the output instruction data stored in the instruction data storage means.

According to another aspect of the present invention, the first execution means may include means for causing the instruction data storage means to store the output instruction data in the case where the generation processing and the determination processing are completed.

According to a further aspect of the present invention, the second execution means may execute the output control regarding the game and reading of data regarding the game in the case where the second execution time is reached. The first execution means may include: means for executing, in the case where the first execution time is reached, the generation processing, the determination processing, and processing of determining whether or not to cause the second execution means to execute the reading of the data; and means for, in the case where it is determined that the second execution means is to be caused to execute the reading of the data, causing the instruction data storage means to store reading instruction data for instructing the second execution means to execute the reading of the data. The second execution means may include: means for starting the reading of the data in the case where the reading instruction data is stored in the instruction data storage means; and means for deleting the reading instruction data from the instruction data storage means in the case where the reading of the data is completed. The first execution means may determine that the reading of the data is completed in the case where the reading instruction data is deleted from the instruction data storage means.

The present invention further provides a game device including: game situation data generating means for generating, at a generation time which comes every first time period, game situation data indicating a situation of a game; game situation data storage means for storing a plurality of pieces of the game situation data generated by the game situation data generating means; and game screen updating means for updating, at an update time which comes every second time period, a game screen based on game situation data corresponding to an attention time which comes a predetermined time period before the update time, in which: the game situation data storage means stores at least first game situation data corresponding to a time which comes before the attention time and second game situation data corresponding to a time which comes after the attention time; and the game screen updating means includes: game situation data acquiring means for acquiring the game situation data corresponding to the attention time by executing interpolation processing based on the first game situation data and the second game situation data; and means for updating the game screen based on the game situation data acquired by the game situation data acquiring means.

The present invention further provides a method of controlling a game device, including: a game situation data generating step of generating, at a generation time which comes every first time period, game situation data indicating a situation of a game; a step of referring to a storage content of game situation data storage means storing a plurality of pieces of the game situation data generated in the game situation data generating step; and a game screen updating step of updating, at an update time which comes every second time period, a game screen based on game situation data corresponding to an attention time which comes a predetermined time period before the update time, in which: the game situation data storage means stores at least first game situation data corresponding to a time which comes before the attention time and second game situation data corresponding to a time which comes after the attention time; and the game screen updating step includes: a game situation data acquiring step of acquiring the game situation data corresponding to the attention time by executing interpolation processing based on the first game situation data and the second game situation data; and a step of updating the game screen based on the game situation data acquired in the game situation data acquiring step.

The present invention further provides a program for causing a computer including, for example, a consumer game machine (stationary game machine), a portable game machine, an arcade game machine, a mobile phone, a personal digital assistant (PDA), or a personal computer, to function as a game device, the program further causing the computer to function as: game situation data generating means for generating, at a generation time which comes every first time period, game situation data indicating a situation of a game; means for referring to a storage content of game situation data storage means storing a plurality of pieces of the game situation data generated by the game situation data generating means; and game screen updating means for updating, at an update time which comes every second time period, a game screen based on game situation data corresponding to an attention time which comes a predetermined time period before the update time, in which: the game situation data storage means stores at least first game situation data corresponding to a time which comes before the attention time and second game situation data corresponding to a time which comes after the attention time; and the game screen updating means includes: game situation data acquiring means for acquiring the game situation data corresponding to the attention time by executing interpolation processing based on the first game situation data and the second game situation data; and means for updating the game screen based on the game situation data acquired by the game situation data acquiring means.

The present invention further provides a computer-readable information storage medium storing the above-mentioned program.

According to the present invention, it is possible to reduce the workload of a game developer in developing a game (game program) compatible with a plurality of game devices having different processing execution intervals.

BRIEF DESCRIPTION OF THE DRAWINGS

[FIG. 14] A diagram illustrating an example of an audio data table.

[FIG. 15] A diagram illustrating an example of a state of a primary queue for instruction data.

[FIG. 16] A diagram illustrating an example of a state of a secondary queue for the instruction data.

BEST MODE FOR CARRYING OUT THE INVENTION

Hereinafter, detailed description is given of examples of embodiments of the present invention with reference to the drawings. A game device according to the embodiments of the present invention is implemented by, for example, a consumer game machine (stationary game machine), a personal computer, a portable game machine, a mobile phone, or a personal digital assistant (PDA). Herein, description is given of a case in which the game device according to an embodiment of the present invention is implemented by a consumer game machine.

First Embodiment

Figure 1:
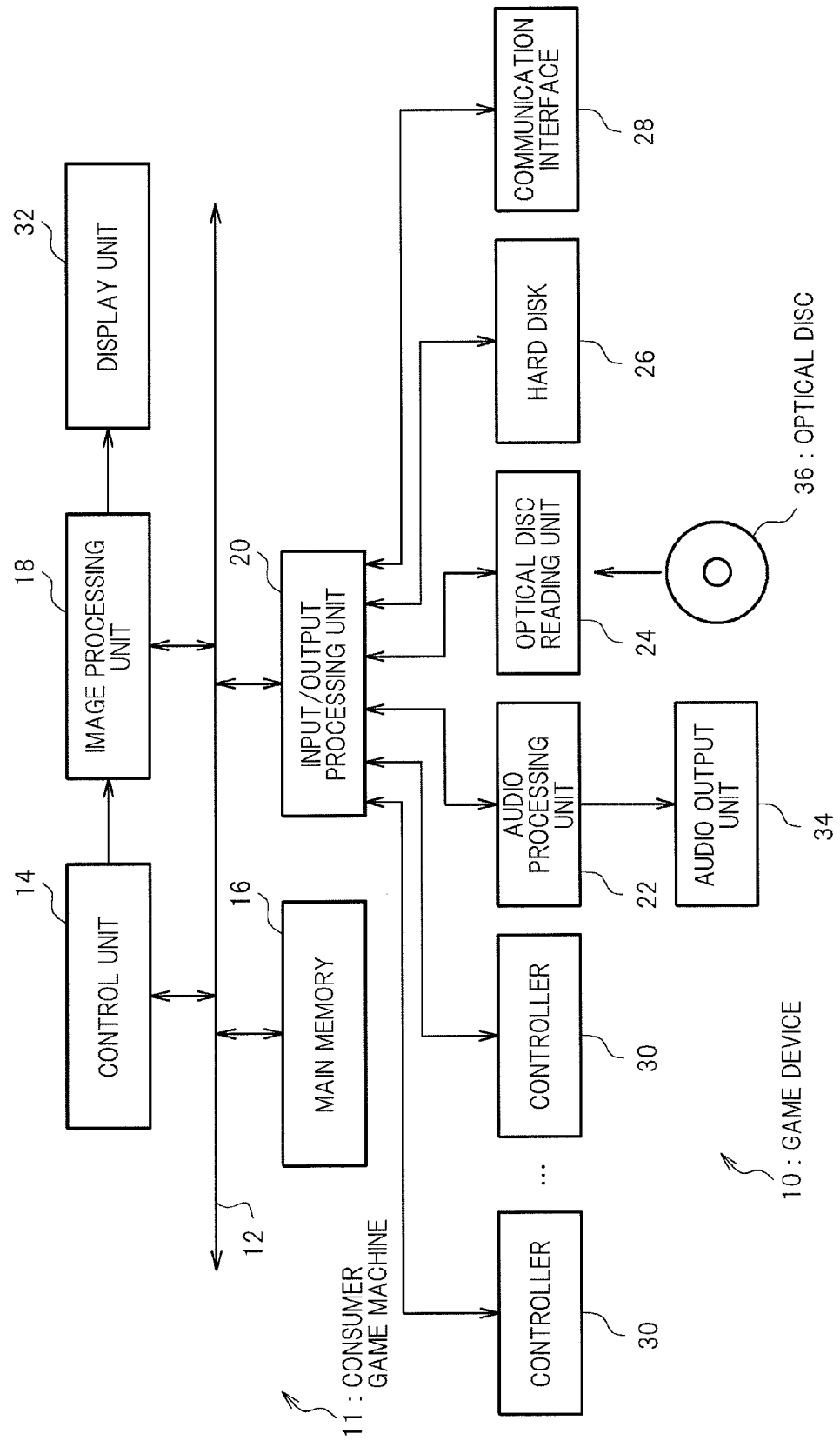
[FIG. 1] A diagram illustrating a hardware configuration of a game device according to a first embodiment.

FIG. 1 is a diagram illustrating a hardware configuration of a game device 10 according to a first embodiment of the present invention. As illustrated in FIG. 1, the game device 10 includes a consumer game machine 11, a display unit 32, an audio outputting unit 34, and an optical disc 36 (information storage medium). The display unit 32 is such a display device as a television set or a liquid crystal display, for example. The audio outputting unit 34 is such an audio outputting device as a speaker or headphones, for example.

The consumer game machine 11 is a computer game system. The consumer game machine 11 includes a bus 12, a control unit 14, a main memory 16, an image processing unit 18, an input/output processing unit 20, an audio processing unit 22, an optical disc reading unit 24, a hard disk 26, a communication interface 28, and a controller 30.

The control unit 14 includes one or a plurality of microprocessors. The control unit 14 executes various types of information processing based on an operating system stored in a ROM (not shown), or a program read from the optical disc 36. The control unit 14 is able to execute a plurality of items of processing in different threads. The main memory 16 includes, for example, a RAM. The program and data read from the optical disc 36 are written into the main memory 16 as necessary. The main memory 16 is also used as a working memory for the control unit 14.

The bus 12 is used for exchanging addresses and data among the components of the consumer game machine 11. The image processing unit 18 includes a VRAM, and renders, based on image data supplied from the control unit 14, a game screen in the VRAM. Then, the game screen rendered in the VRAM is converted into video signals, and the video signals are output to the display unit 32 at a predetermined time.

The input/output processing unit 20 is an interface for the control unit 14 to access the audio processing unit 22, the optical disc reading unit 24, the hard disk 26, the communication interface 28, and the controller 30. The audio processing unit 22 includes a sound buffer, and outputs, from the audio outputting unit 34, various types of audio data (for example, game music, game sound effects, dialogue, etc.)

that have been loaded from the optical disc 36 into the sound buffer. The communication interface 28 is an interface for connecting the consumer game machine 11 to a communication network by wire or wireless.

The optical disc reading unit 24 reads a program or data recorded on the optical disc 36. Herein, the optical disc 36 is used for supplying the program or the data to the consumer game machine 11. Alternatively, another information storage medium, such as a memory card, may be used. Alternatively, the program or the data may be supplied to the consumer game machine 11 from a remote place via a communication network such as the Internet, for example. The hard disk 26 is a commonly-used hard disk device (auxiliary storage device). The program or the data, which is supposed to be stored in the optical disc 36 in the following description, may be stored in the hard disk 26.

The controller 30 is operation means for a user to perform various types of game operations. A plurality of the controllers 30 may be connected to the consumer game machine 11 by wire or wireless. It should be noted that the controller 30 includes a vibration function. That is, the controller is structured to vibrate in accordance with the instruction from the control section 14.

The input/output processing unit 20 scans a state of the controller 30 at fixed intervals (for example, every $1/60^{th}$ of a second), and then transfers an operation signal indicating a result of the scanning to the control unit 14 via the bus 12. The control unit 14 performs judgment on the user's game operation based on the operation signal.

On the game device 10, for example, a soccer game simulating a soccer match is executed between a first team and a second team. The soccer game is implemented by executing a game program read from the optical disc 36.

Figure 2:
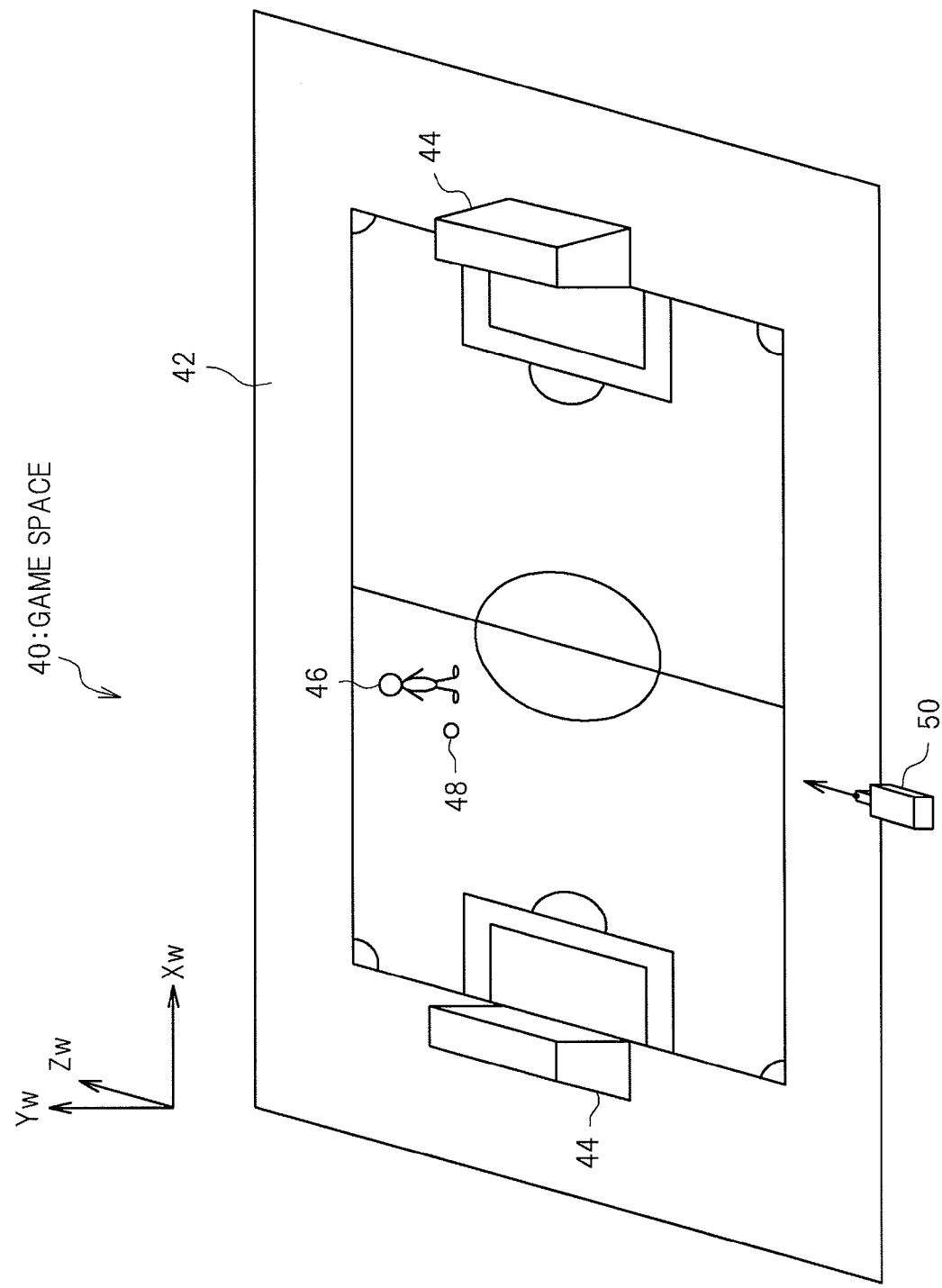
[FIG. 2] A diagram illustrating an example of a game space.

In order to execute the soccer game, a game space is built in the main memory 16. FIG. 2 is an example of the game space. A game space 40 illustrated in FIG. 2 is a virtual three-dimensional space. As illustrated in FIG. 2, a field 42, which is an object representing a soccer field, is disposed in the game space 40. Goals 44, which are objects representing soccer goals, a player character 46, which is an object representing a soccer player, and a ball 48, which is an object representing a soccer ball, are disposed on the field 42. Eleven player characters 46 belonging to the first team, and another eleven player characters 46 belonging to the second team are disposed on the field 42, but illustration thereof is omitted in FIG. 2.

One of the goals 44 is associated with the first team, whereas the other one of the goals 44 is associated with the second team. When the ball 48 moves into the goal 44 associated with any one of the teams, a scoring event occurs for the other one of the teams.

Figure 3:
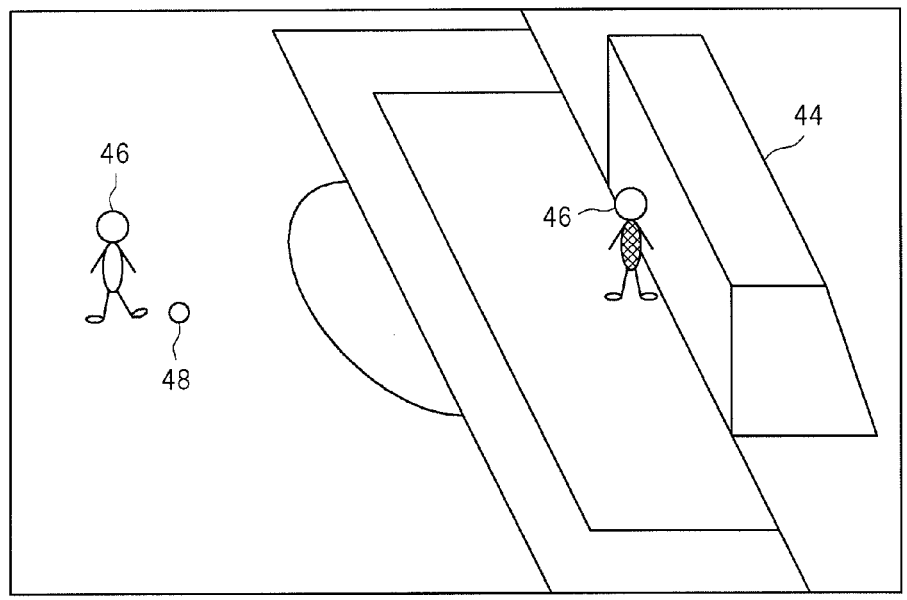
[FIG. 3] A diagram illustrating an example of a game screen.

In addition, a virtual camera 50 (viewpoint) is set in the game space 40. A game screen showing a situation of the game space 40, which is viewed from the virtual camera 50, is displayed on the display unit 32. FIG. 3 is one example of the game screen. For example, in order to constantly display the ball 48 on the game screen, the virtual camera 50 moves around within the game space 40 according to the position of the ball 48.

Further, in the soccer game, play-by-play audio reporting on a current situation of a game (match) is output. For example, when a shot has been made, play-by-play audio reporting that a shot has been made, such as "shot!", is output.

The game device 10 stores data indicating the state of the game space 40 as game situation data indicating the situation of the game. For example, the following items of data are stored as the game situation data:

(1) data indicating the current state (for example, position, orientation, posture, type of action, etc.) of each of the player characters 46 belonging to the first team;
(2) data indicating the current state (for example, position, orientation, posture, type of action, etc.) of each of the player characters 46 belonging to the second team;
(3) data indicating the current state (for example, position, moving direction, etc.) of the ball 48;
(4) data indicating the current state (for example, position, line-of-sight direction, etc.) of the virtual camera 50;
(5) data indicating the scores of both teams; and
(6) data indicating an elapsed time.

Next, description is given of processing to be executed in the game device 10. In the game device 10, processing of generating the game situation data and processing of updating the game screen are executed by separate threads.

Figure 4:
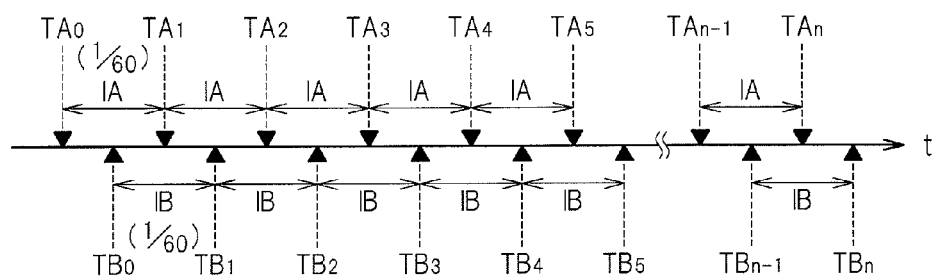
[FIG. 4] A diagram for describing an example of execution time for processing of generating game situation data and processing of updating the game screen.
Figure 5:
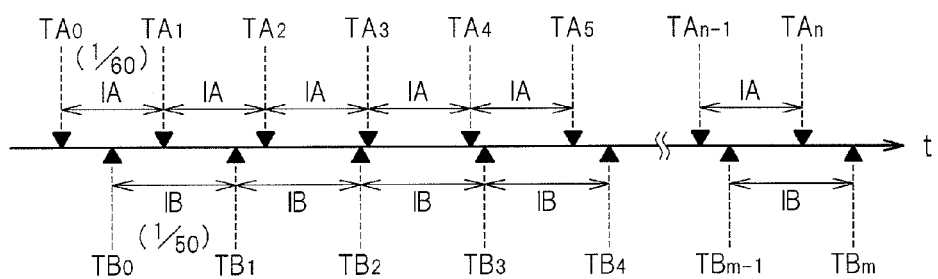
[FIG. 5] A diagram for describing another example of the execution time for the processing of generating the game situation data and the processing of updating the game screen.

FIGS. 4 and 5 are diagrams each for describing an example of execution time of the processing of generating the game situation data and the processing of updating the game screen. FIG. 4 illustrates an example of the execution time of the respective items of processing performed when the television set serving as the display unit 32 is compliant with the National Television System Committee (NTSC) system. FIG. 5 illustrates an example of the execution time of the respective items of processing performed when the television set serving as the display unit 32 is compliant with the Phase Alternating Line (PAL) system.

In FIGS. 4 and 5, a t-axis represents a time axis. Further, times $TA_0$ to $TA_5$, $TA_{n-1}$, and $TA_n$ represent the execution time for the processing of generating the game situation data, and times $TB_0$ to $TB_5$, $TB_{m-1}$, $TB_m$, $TB_{n-1}$, and $TB_n$ represent the execution times for the processing of updating the game screen. Note that, the time $TA_0$ is the first execution time of the processing of generating the game situation data, and the time $TB_0$ is the first execution time of the processing of updating the game screen. The time $TB_0$ comes later than the time $TA_0$.

As illustrated in FIGS. 4 and 5, an execution interval (IA) of the processing of generating the game situation data is set regardless of the system of the display unit 32 (for example, television set). In the examples illustrated in FIGS. 4 and 5, regardless of whether the system of the television set serving as the display unit 32 is the NTSC system or the PAL system, the execution interval (IA) is set to $1/60^{th}$ of a second (or $1/30^{th}$ of a second).

On the other hand, an execution interval (IB) of the processing of updating the game screen is set to a time period corresponding to the system of the display unit 32 (for example, television set). For example, when the system of the television set serving as the display unit 32 is the NTSC system, as illustrated in FIG. 4, the execution interval (IB) is set to $1/60^{th}$ of a second (or $1/30^{th}$ of a second). Further, for example, when the system of the television set serving as the display unit 32 is the PAL system, as illustrated in FIG. 5, the execution interval (IB) is set to $1/50^{th}$ of a second (or $1/25^{th}$ of a second).

Figure 6:
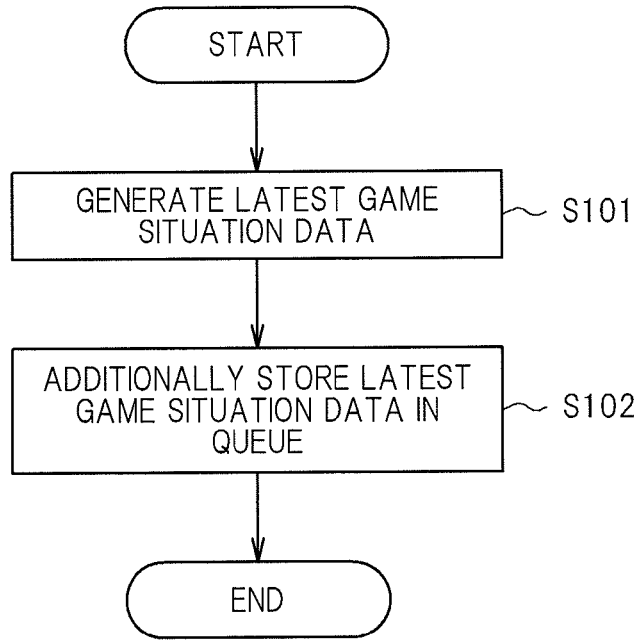
[FIG. 6] A flow chart illustrating an example of the processing of generating the game situation data.

Here, the processing of generating the game situation data is described in detail. FIG. 6 is a flow chart illustrating an example of the processing of generating the game situation data, which is executed at the times $TA_1$ to $TA_5$, $TA_{n-1}$, $TA_n$, and the like. The processing illustrated in FIG. 6 is executed every first time period (IA: $1/60^{th}$ of a second in this example).

As illustrated in FIG. 6, the control unit 14 generates the latest game situation data based on the game situation data generated at the previous execution time of this processing (S101).

Figure 7:
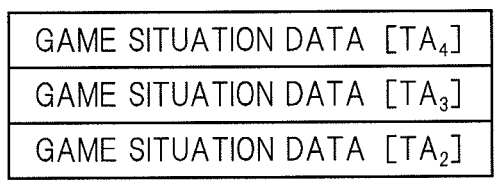
[FIG. 7] A schematic diagram illustrating an example of a state of a queue.

Further, in the game device 10, a queue for storing the game situation data generated in this processing is provided to the main memory 16. In the queue, a predetermined number of items of the game situation data are stored in reverse chronological order. FIG. 7 is a schematic diagram illustrating an example of the queue. FIG. 7 illustrates the state of the queue obtained when the execution of this processing is completed at the time $TA_4$. In other words, FIG. 7 illustrates the state of the queue obtained immediately before this processing is executed at the time $TA_5$.

In the example illustrated in FIG. 7, three items of the game situation data are stored in the queue. Specifically, the game situation data generated at the time $TA_2$, the game situation data generated at the time $TA_3$, and the game situation data generated at the time $TA_4$ are stored in the queue. Note that, the game situation data corresponding to the time $TA_n$ is herein referred to as "game situation data $[TA_n]$". Further, how the number of items of the game situation data to be stored in the queue is determined is described later.

In Step S101, first, the control unit 14 refers to the game situation data generated at the previous execution time of this processing. For example, when a current time is at the time $TA_5$, game situation data $[TA_4]$ stored in the queue is referred to.

Then, the control unit 14 generates the latest game situation data based on the game situation data generated at the previous execution time and an operation performed by the user. More specifically, as described below, the control unit 14 generates the latest game situation data by updating, based on the operation performed by the user, the game situation data generated at the previous execution time.

For example, the control unit 14 updates, based on the operation performed by the user, the state (for example, position, orientation, posture, type of action, etc.) of the player character 46 set as an operation subject of the user. Specifically, the control unit 14 updates, based on the operation performed by the user, the state of the player character 46 set as the operation subject of the user so that the player character 46 set as the operation subject of the user acts in accordance with the operation performed by the user.

Further, for example, the control unit 14 updates, based on a behavior control algorithm, the state (for example, position, orientation, posture, type of action, etc.) of the player character 46 which is not set as the operation subject of the user. Specifically, the control unit 14 updates, based on the behavior control algorithm, the state of the player character 46 which is not set as the operation subject of the user so that the player character 46 which is not set as the operation subject of the user acts in accordance with the behavior control algorithm.

Further, for example, the control unit 14 updates the state (for example, position, moving direction, etc.) of the ball 48. For example, when the player character 46 set as the operation subject of the user has made a pass or a shot, the control unit 14 updates the state of the ball 48 so that the ball 48 moves in a direction specified by the user.

Further, for example, the control unit 14 updates the state of the virtual camera 50 (for example, position, line-of-sight direction, etc.). For example, the control unit 14 updates the state of the virtual camera 50 based on the position of the ball 48 so that the ball 48 is always displayed within the game screen.

Figure 8:
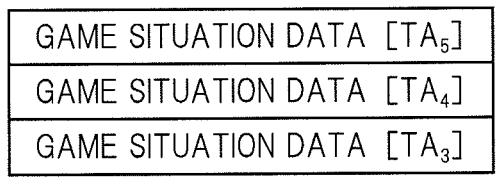
[FIG. 8] A diagram illustrating another example of the state of the queue.

After the latest game situation data is generated, the control unit 14 causes the latest game situation data to be additionally stored in the queue (S102). Note that if the predetermined number of items of the game situation data are already stored in the queue, the oldest game situation data of the items of the game situation data stored in the queue is deleted, and the latest game situation data is additionally stored in the queue. FIG. 8 illustrates the state of the queue obtained after the execution of this processing at the time $TA_5$ is completed. In the queue illustrated in FIG. 8, compared to that of FIG. 7, game situation data $[TA_2]$ is deleted, and the game situation data $[TA_5]$ is stored instead. With this, this processing is ended.

Figure 9:
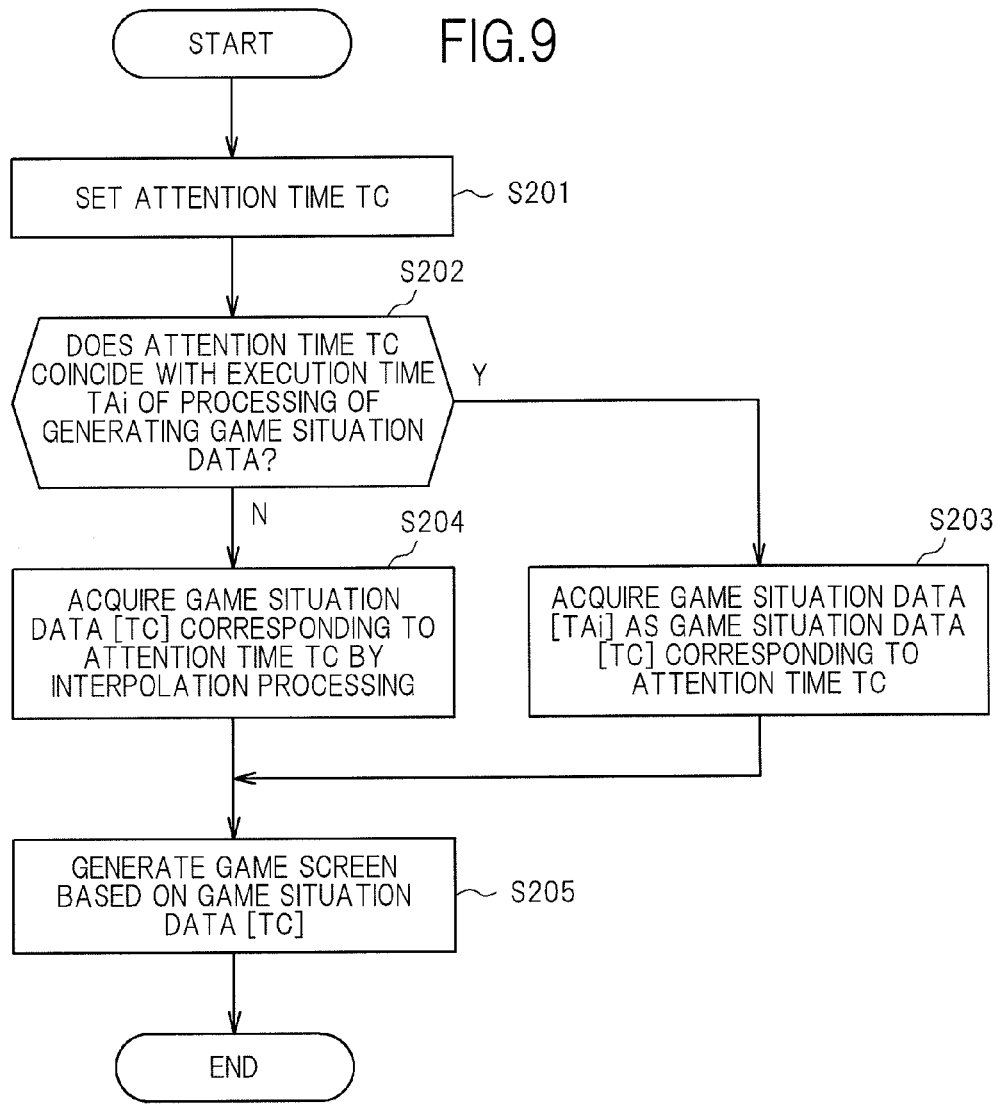
[FIG. 9] A flow chart illustrating an example of the processing of updating the game screen.

Next, the processing of updating the game screen is described in detail. FIG. 9 is a flow chart illustrating an example of the processing of updating the game screen, which is executed at the times $TB_0$ to $TB_5$, $TB_{m-1}$, $TB_m$, $TB_{n-1}$, $TB_n$, and the like. As described above, the processing illustrated in FIG. 9 is executed every second time period (IB). For example, when the system of the television set serving as the display unit 32 is the NTSC system, the second time period (IB) is $\frac{1}{60}^{th}$ of a second, and when the system of the television set serving as the display unit 32 is the PAL system, the second time period (IB) is $\frac{1}{50}^{th}$ of a second.

Figure 10:
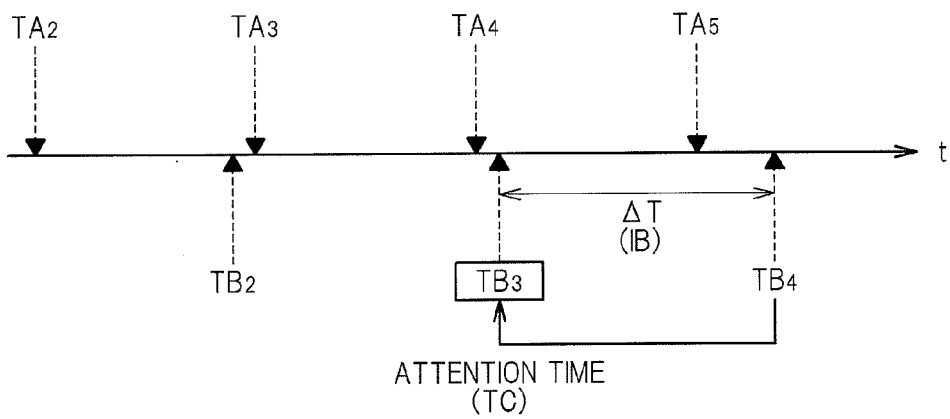
[FIG. 10] A diagram for describing details of the processing of updating the game screen.

FIG. 10 is a diagram for describing details of the processing of updating the game screen. FIG. 10 illustrates an example of the execution times of the respective items of the processing performed when the system of the television set serving as the display unit 32 is the PAL system, and corresponds to FIG. 5.

As illustrated in FIG. 9, the control unit 14 sets a time which comes a predetermined time period ($\Delta T$) before a current time point as an attention time TC (S201). In this embodiment, the above-mentioned predetermined time period ($\Delta T$) is set so as to be equal to the execution interval (IB) of this processing. In other words, in this embodiment, the previous execution time of this processing is set as the attention time TC. For example, if the current time is at the time $TB_4$, as illustrated in FIG. 10, the time $TB_3$, which comes the predetermined time period ($\Delta T$: IB) before the time $TB_4$, is set as the attention time TC.

After that, the control unit 14 determines whether or not the attention time TC coincides with any one of execution times $TA_i$ of the processing of generating the game situation data (S202). If the attention time TC coincides with any one of the execution times $TA_i$ of the processing of generating the game situation data, the control unit 14 acquires game situation data $[TA_i]$ generated at that execution time $TA_i$ as game situation data $[TC]$ corresponding to the attention time TC (S203).

On the other hand, if the attention time TC does not coincide with any one of the execution times $TA_i$ of the processing of generating the game situation data, the control unit 14 acquires the game situation data $[TC]$ corresponding to the attention time TC by interpolation processing (S204).

In Step S204, the control unit 14 refers to the game situation data corresponding to a time which comes before the attention time TC (referred to as "game situation data X"). For example, the game situation data X is such game situation data that is generated at the "execution time of the processing of generating the game situation data", which comes before the attention time TC and is closest to the attention time TC. For example, in the case of FIG. 10, the attention time TC is the time $TB_3$, and thus the game situation data $[TA_4]$ stored in the queue corresponds to the game situation data X.

Further, in Step S204, the control unit 14 refers to the game situation data corresponding to a time which comes after the attention time TC (referred to as "game situation data Y"). For example, the game situation data Y is such game situation data that is generated at the "execution time of the processing of generating the game situation data", which comes after the attention time TC and is closest to the attention time TC. For example, in the case of FIG. 10, the attention time TC is the time $TB_3$, and thus the game situation data $[TA_5]$ stored in the queue corresponds to the game situation data Y.

Further, in Step S204, the control unit 14 interpolates between the game situation data X and the game situation data Y, to thereby generate the game situation data [TC] corresponding to the attention time TC. For example, in the case of FIG. 10, the control unit 14 interpolates between the game situation data $[TA_4]$ and the game situation data $[TA_5]$ based on a ratio between a time period from the time $TA_4$ to the attention time TC and a time period from the attention time TC to the time $TA_5$, to thereby generate the game situation data [TC] corresponding to the attention time.

By the way, in order to generate the game situation data [TC] corresponding to the attention time TC in Step S204, both the game situation data X (game situation data corresponding to a time which comes before the attention time TC) and the game situation data Y (game situation data corresponding to a time which comes after the attention time TC) need to be stored in the queue. In this respect, in this embodiment, in order to ensure that both items of the game situation data X and Y are stored in the queue, such a queue as described below needs to be prepared.

When a relationship of $IA*(N-1) < \Delta T \leq IA*N$ is satisfied between the execution interval (IA) of the processing of generating the game situation data and the period ($\Delta T$) between the attention time TC and the execution time of the processing of updating the game screen, the processing of generating the game situation data may possibly be executed N times during the above-mentioned period ($\Delta T$). Note that, "N" is a positive integer.

For example, if the television set serving as the display unit 32 is compliant with the PAL system (see FIG. 5), IA and $\Delta T$ are $\frac{1}{60}^{th}$ of a second and $\frac{1}{50}^{th}$ of a second, respectively, and hence the relationship of $IA*1 < \Delta T \leq IA*2$ is satisfied. Thus, the processing of generating the game situation data may possibly be executed twice during the above-mentioned period ($\Delta T$). In fact, as illustrated in FIG. 5, if the current time is at the time $TB_3$, the processing of generating the game situation data is executed twice during the period ($\Delta T$) between the time $TB_2$, which is the attention time TC, and the execution time $TB_3$ of the processing of updating the game screen.

When the processing of generating the game situation data is executed N times during the above-mentioned period ($\Delta T$), if at least (N+1) items of the game situation data are stored in the queue, both the game situation data X (game situation data corresponding to a time which comes before the attention time TC) and the game situation data Y (game situation data corresponding to a time which comes after the attention time TC) are stored in the queue. Accordingly, when the relationship of $IA*(N-1) < \Delta T \leq IA*N$ is satisfied, it is necessary to prepare a queue which can store at least (N+1) items of the game situation data.

As illustrated in FIG. 9, after the game situation data [TC] corresponding to the attention time TC is acquired in Step S203 or Step S204, the control unit 14 generates a game screen based on the game situation data [TC] (S205). Specifically, a game screen showing how the game space 40 in which the player characters 46 and the ball 48 are arranged based on the game situation data [TC] looks when viewed from the virtual camera 50 is generated in the VRAM. Then, the game screen generated in the VRAM is displayed on the display unit 32. With this, this processing is ended.

Figure 11:
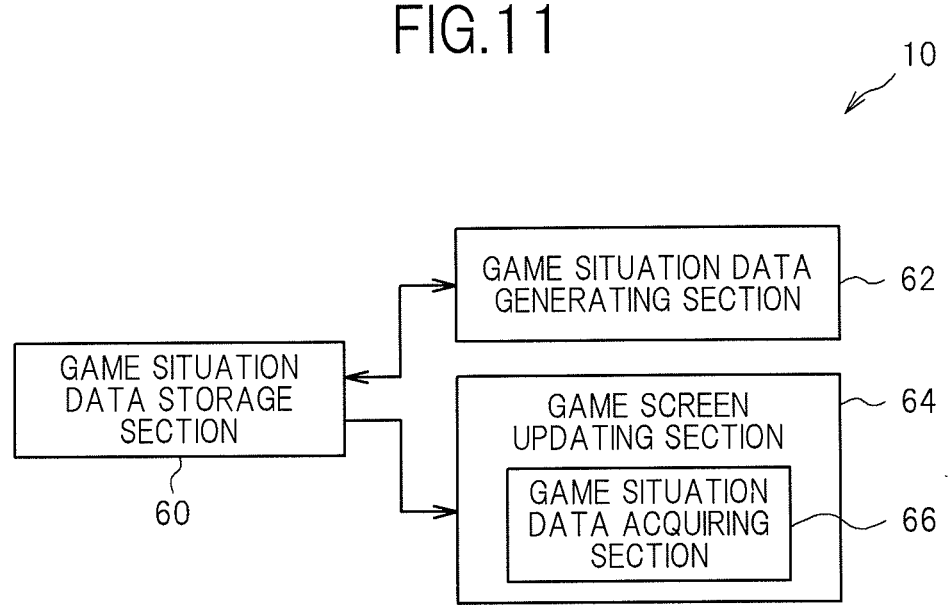
[FIG. 11] A functional block diagram illustrating functions to be implemented in the game device according to the first embodiment.

Next, description is given of functions to be implemented in the game device 10. FIG. 11 is a functional block diagram mainly illustrating, of the functions to be implemented in the game device 10, functions relevant to the present invention.

As illustrated in FIG. 11, the game device 10 includes a game situation data storage section 60, a game situation data generating section 62 (first execution means), and a game screen updating section 64 (second execution means). The game situation data storage section 60 is implemented mainly by, for example, the main memory 16. The game situation data generating section 62 and the game screen updating section 64 are implemented mainly by, for example, the control unit 14.

The game situation data generating section 62 generates the game situation data indicating the situation of the game at generation times (first execution times: for example, times $TA_0$ to $TA_5$, $TA_{n-1}$, and $TA_n$: see FIGS. 4 and 5) which come every first time period (IA: see FIGS. 4 and 5). For example, the game situation data generating section 62 generates the game situation data every $\frac{1}{60}^{th}$ of a second. For example, the control unit 14 executes the processing illustrated in FIG. 6 in accordance with the program recorded on the optical disc 36, to thereby implement the game situation data generating section 62.

The game situation data storage section 60 stores a plurality of items of the game situation data generated by the game situation data generating section 62. For example, the game situation data storage section 60 includes the queue (see FIGS. 7 and 8) for storing the predetermined number of items of the game situation data recently generated by the game situation data generating section 62.

At update times (second execution times: for example, times $TB_0$ to $TB_5$, $TB_{m-1}$, $TB_m$, $TB_{n-1}$, and $TB_n$: see FIGS. 4 and 5) which come every second time period (IB: see FIGS. 4 and 5), the game screen updating section 64 updates the game screen based on the game situation data [TC] corresponding to the attention time TC, which comes the predetermined time period before the update time.

The game screen updating section 64 includes a game situation data acquiring section 66. The game situation data acquiring section 66 acquires the game situation data [TC] corresponding to the attention time TC.

For example, when the attention time TC coincides with the generation time (for example, times $TA_0$ to $TA_5$, $TA_{n-1}$, and $TA_n$: see FIGS. 4 and 5) of the game situation data, the game situation data acquiring section 66 acquires the game situation data generated at that generation time as the game situation data [TC] corresponding to the attention time TC.

On the other hand, when the attention time TC does not coincide with the generation time of the game situation data, the game situation data acquiring section 66 executes the interpolation processing based on the game situation data X (first game situation data) corresponding to a time which comes before the attention time TC and the game situation data Y (second game situation data) corresponding to a time which comes after the attention time TC, to thereby acquire the game situation data [TC] corresponding to the attention time TC. Note that, the items of the game situation data X and Y are stored in the game situation data storage section 60 (queue), and the game situation data acquiring section 66 refers to the items of the game situation data X and Y stored in the game situation data storage section 60 (queue).

When the game situation data [TC] corresponding to the attention time TC is acquired by the game situation data acquiring section 66, the game screen updating section 64 updates the game screen based on the game situation data [TC].

Note that, for example, the game screen updating section 64 (game situation data acquiring section 66) is implemented by executing, by the microprocessor, the processing illustrated in FIG. 9 in accordance with the program recorded on the optical disc 36.

In the game device 10 described above, the processing of generating the game situation data and the processing of updating the game screen are executed by separate threads. The execution interval (IA) of the processing of generating the game situation data is set to the first time period (for example, $1/60^{th}$ of a second), regardless of the system of the display unit 32 (display device) for displaying the game screen. On the other hand, the execution interval (IB) of the processing of updating the game screen is set to the second time period, which corresponds to the system of the display unit 32 for displaying the game screen. For example, if the system of the display unit 32 is the NTSC system, the second time period is set to $1/60^{th}$ of second, and if the system of the display unit 32 is the PAL system, the second time period is set to $1/50^{th}$ of a second.

Here, it is assumed that V represents the amount of movement of the player character 46 (or the ball 48) moving in a given direction, which is obtained each time the processing of generating the game situation data is executed once (in other words, every one frame). In the game device 10, the execution interval (IA) of the processing of generating the game situation data is set to the first time period (for example, $1/60^{th}$ of a second), regardless of the system of the display device for displaying the game screen, and hence the amount of movement per second of the player character 46 (or the ball 48) is 60*V in both cases where the game screen is displayed on the display unit 32 compliant with the NTSC system and where the game screen is displayed on the display unit 32 compliant with the PAL system. Therefore, according to this embodiment, a game developer does not need to adjust the amount of movement of the player character 46 (or the ball 48), which is obtained each time the processing of generating the game situation data is executed once (in other words, everyone frame), in consideration of the system of the display unit 32 for displaying the game screen. As a result, the workload of the game developer is reduced.

Further, in the game device 10, in the processing of updating the game screen, instead of updating the game screen based on the latest game situation data obtained at the present time, the game situation data [TC] corresponding to the attention time TC, which comes the predetermined time period ($\Delta T$) before the present time, is acquired, and the game screen is updated based on the game situation data [TC]. According to the game device 10, compared to the case of adopting a method of updating the game screen based only on the latest game situation data, there are the following advantages.

For example, when the game screen is updated at the time $TB_3$ of FIG. 10, the processing of generating the game situation data is executed twice ($TA_3$ and $TA_4$) during a period between the time $TB_2$, which is the previous execution time of the processing of updating the game screen, and the time $TB_3$. In such a case, if the game screen is updated by using only the latest game situation data, that is, the game situation data $[TA_4]$ generated at the time $TA_4$, the game screen is changed from the game screen corresponding to the game situation data $[TA_2]$ to the game screen corresponding to the game situation data $[TA_4]$. In this case, the state (for example, position etc.) of the player character 46 or the ball 48 changes significantly on the game screen, which may cause a feeling of unease (strangeness) in the user.

In this respect, in this embodiment, in the processing of updating the game screen, the game screen is updated based on the game situation data [TC] of the attention time TC, which comes the predetermined time period ($\Delta T$) before the present time. As a result, such inconvenience as described above does not occur. Specifically, in this embodiment, when the game screen is updated, the game screen is changed from the game screen corresponding to the game situation data [TC] of the previous attention time TC to the game screen corresponding to the game situation data [TC] of the current attention time TC. Here, the attention time TC is always set as a time which comes the given time period ($\Delta T$) before the execution time of the processing of updating the game screen, and hence the interval between the previous attention time TC and the current attention time TC is always equal to the execution interval (IB) of the processing of updating the game screen and thus is constant. As a result, in this embodiment, the change in state of the player character 46 or the ball 48 when the game screen is updated always corresponds to the given time period (IB).

In addition, according to this embodiment, the processing of generating the game situation data and the processing of updating the game screen are executed by separate threads, which enables the processing speed to be improved. For example, in a case where the control unit 14 includes a plurality of microprocessors, and a plurality of threads are executed by different microprocessors, the processing of generating the game situation data and the processing of updating the game screen are executed by different microprocessors, which results in improved processing speed.

Further, in commonly-used game devices, in order to improve the processing speed, the result of condition determination at a branch is predicted in advance, and subsequent processing after the branch is executed in advance. However, in such a case, if a prediction error occurs (specifically, if the result of condition determination predicted in advance is different from the result of actually-performed condition determination), the subsequent processing after the branch, which has been executed in advance, becomes of no use. As a result, the processing speed is decreased. For example, in a case where the processing of generating the game situation data and the processing of updating the game screen are executed by a single thread, if the above-mentioned prediction error occurs at one branch in the processing of generating the game situation data, the subsequent processing after the branch (subsequent processing after the above-mentioned branch in the processing of generating the game situation data and the processing of updating the game screen), which has been executed in advance, becomes of no use.

To the contrary, in the case where the processing of generating the game situation data and the processing of updating the game screen are executed by separate threads, even if the above-mentioned prediction error occurs at one branch in the processing of generating the game situation data, the processing which becomes of no use is only the subsequent processing after the above-mentioned branch in the processing of generating the game situation data. In other words, compared to the case where the processing of generating the game situation data and the processing of updating the game screen are executed by a single thread, less processing becomes of no use. As a result, it is possible to mitigate the decrease in processing speed caused by the prediction error.

Note that in the description given above, in the processing of updating the game screen (S201 of FIG. 9), the time which comes the predetermined time period ($\Delta T$) before the current time is set as the attention time TC, and the above-mentioned predetermined time period ($\Delta T$) is set to be equal to the execution interval (IB) of the processing of updating the game screen. However, the above-mentioned predetermined time period ($\Delta T$) may be set to be different from the execution interval (IB) of the processing of updating the game screen.

Specifically, the above-mentioned predetermined time period ($\Delta T$) may be set to be longer or shorter than the execution interval (IB) of the processing of updating the game screen.

Figure 12:
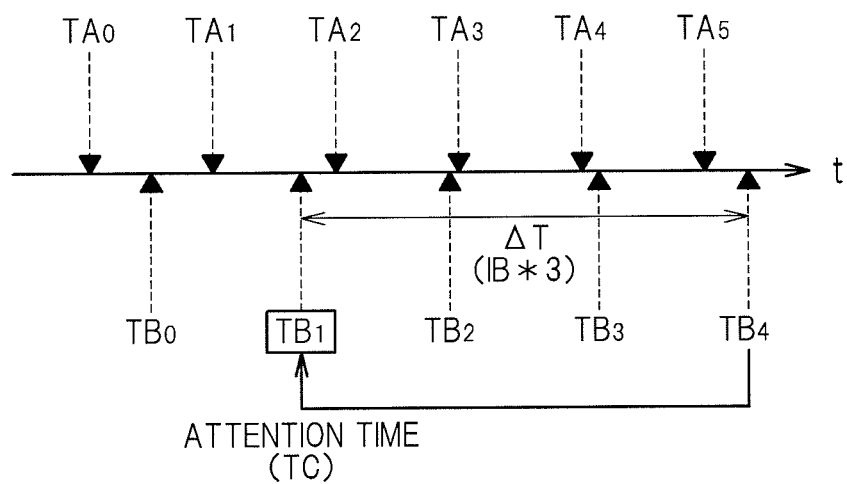
[FIG. 12] A diagram for describing an example of a method of setting an attention time.

FIG. 12 is a diagram illustrating another example of the method of setting the attention time TC. FIG. 12 illustrates a case where the above-mentioned predetermined time period ($\Delta T$) is set to be longer than the execution interval (IB) of the processing of updating the game screen. In FIG. 12, the predetermined time period ($\Delta T$) is set to be three times the length of the execution interval (IB) of the processing of updating the game screen.

In the case illustrated in FIG. 12, at the time $TB_4$, in order to generate the game situation data [TC] of the attention time TC, game situation data [$TA_1$] generated in the processing of generating the game situation data, whose execution is started at the time $TA_1$, and the game situation data [$TA_2$] generated in the processing of generating the game situation data, whose execution is started at the time $TA_2$, are used.

Here, for example, if the processing of generating the game situation data, whose execution is started at the time $TA_2$, is not completed at the time $TB_4$ (in other words, if the game situation data [$TA_2$] is in an incomplete state halfway through the generation), a problem of so-called processing delay occurs.

In this respect, in the case illustrated in FIG. 12, a time period from the time $TA_2$ to the time $TB_4$ is relatively long, and hence, at the time $TB_4$, the processing of generating the game data, whose execution is started at the time $TA_2$, has been completed, and consequently, the game situation data [$TA_2$] is in a complete state as well. As a result, the problem of processing delay does not occur. As described above, according to this embodiment, it is possible to suppress the occurrence of the problem of processing delay as well.

By the way, in determining the above-mentioned predetermined time period ($\Delta T$), it is necessary to determine the above-mentioned predetermined time period ($\Delta T$) so that the attention time TC does not come after the previous execution time of the processing of generating the game situation data. The reason for this is as follows. If the attention time TC comes after the previous execution time of the processing of generating the game situation data, the game situation data [TC] corresponding to the attention time TC cannot be acquired. Specifically, in Step S201 of FIG. 9, if a time which comes after the previous execution time of the processing of generating the game situation data is set as the attention time TC, the game situation data Y corresponding to a time which comes after the attention time TC cannot be acquired in Step S204, and as a result, the game situation data [TC] corresponding to the attention time TC cannot be acquired.

In this respect, if the above-mentioned predetermined time period ($\Delta T$) is set to be equal to or longer than the execution interval (IA) of the processing of generating the game situation data, the processing of generating the game situation data is executed at least once during the above-mentioned predetermined time period ($\Delta T$). As a result, it is possible to ensure that the attention time TC does not come after the previous execution time of the processing of generating the game situation data. For this reason, the above-mentioned predetermined time period ($\Delta T$) is desirably set to be equal to or longer than the execution interval (IA) of the processing of generating the game situation data.

Second Embodiment

A game device 10 according to a second embodiment has the same hardware configuration as in the first embodiment (see FIG. 1). Further, in the second embodiment, similarly to the first embodiment, for example, a soccer game is executed. Specifically, the same game space 40 as in the first embodiment (see FIG. 2) is built, and the same game screen as in the first embodiment (see FIG. 3) is displayed. Further, in the second embodiment, the same game situation data as in the first embodiment is stored.

Description is given of processing to be executed in the second embodiment. In the second embodiment, game processing and main processing are executed by separate threads.

For example, the game processing includes the following items of processing:
(1) processing of generating the game situation data; and
(2) processing of determining the content of control (for example, audio output control) to be executed in the main processing.

Note that the processing of generating the game situation data is the same processing as the "processing of generating the game situation data" according to the first embodiment. The game processing is described later in detail (see FIG. 13).

On the other hand, for example, the main processing includes the following items of processing:
(1) processing of updating the game screen;
(2) processing of causing the audio output unit 34 to output audio;
(3) processing of causing the controller 30 to vibrate; and
(4) processing of reading a program or data from the optical disc 36 (or hard disk 26) into the main memory 16.

Note that the processing of updating the game screen is the same processing as the "processing of updating the game screen" according to the first embodiment. Hereinbelow, description is given by assuming that the processing of updating the game screen and the processing of causing the audio output unit 34 to output audio are mainly executed in the main processing. The main processing is described later in detail (see FIG. 17).

Description is given of the execution times of the game processing and the main processing with reference to FIGS. 4 and 5. In this case, too, FIG. 4 illustrates an example of the execution times of the respective items of processing performed when the television set serving as the display unit 32 is compliant with the NTSC system. FIG. 5 illustrates an example of the execution times of the respective items of processing performed when the television set serving as the display unit 32 is compliant with the PAL system.

The execution time of the game processing is the same as the execution time of the "processing of generating the game situation data" according to the first embodiment. For example, the times $TA_0$ to $TA_5$, $TA_{n-1}$, and $TA_n$ illustrated in FIGS. 4 and 5 serve as the execution times of the game processing.

In other words, similarly to the "processing of generating the game situation data" according to the first embodiment, the execution interval (IA) of the game processing is set regardless of the system of the display unit 32 (for example, television set). For example, regardless of whether the system of the television set serving as the display unit 32 is the NTSC system or the PAL system, the execution interval (IA) is set to $1/60^{th}$ of a second (or $1/30^{th}$ of a second).

On the other hand, the execution time of the main processing is the same as the execution time of the "processing of updating the game screen" according to the first embodiment, and the times $TB_0$ to $TB_5$, $TB_{m-1}$, $TB_m$, $TB_{n-1}$, and $TB_n$ illustrated in FIGS. 4 and 5 serve as the execution time of the main processing.

In other words, similarly to the "processing of updating the game screen" according to the first embodiment, the execution interval (IB) of the main processing is set to a time period corresponding to the system of the display unit 32 (for example, television set). For example, when the television set serving as the display unit 32 is compliant with the NTSC system, as illustrated in FIG. 4, the execution interval (IB) is set to $\frac{1}{60}^{th}$ of a second (or $\frac{1}{30}^{th}$ of a second). Further, for example, when the television set serving as the display unit 32 is compliant with the PAL system, as illustrated in FIG. 5, the execution interval (IB) is set to $\frac{1}{50}^{th}$ of a second (or $\frac{1}{25}^{th}$ of a second).

Figure 13:
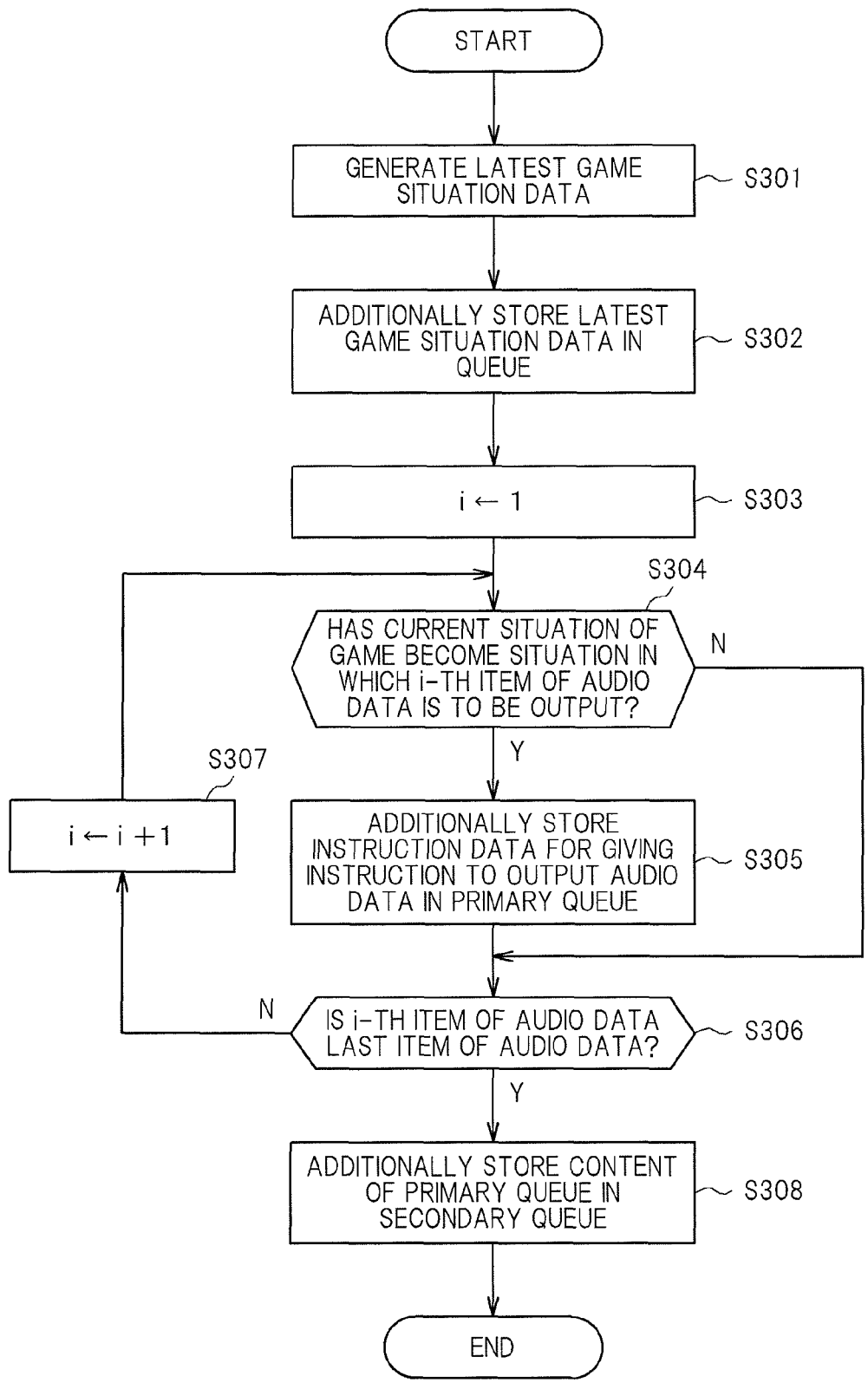
[FIG. 13] A flow chart illustrating an example of game processing.

Next, the game processing is described in detail. FIG. 13 is a flow chart illustrating an example of the game processing, which is executed at the times $TA_1$ to $TA_5$, $TA_{n-1}$, $TA_n$, and the like. The game processing illustrated in FIG. 13 is executed every first time period (IA: $\frac{1}{60}^{th}$ of a second in this example).

As illustrated in FIG. 13, the control unit 14 generates the latest game situation data based on the game situation data generated at the previous execution time of this processing (S301). The processing of Step S301 is the same as in Step S101 of FIG. 6. Specifically, similarly to the first embodiment, in the second embodiment too, a queue for the game situation data is provided in the main memory 16 (see FIGS. 7 and 8). In the processing of Step S301, the game situation data generated at the previous execution time is read from the queue for the game situation data, and the latest game situation data is generated based on the game situation data and the operation performed by the user.

After the latest game situation data is generated, the control unit 14 additionally stores the latest game situation data in the queue for the game situation data (S302). The processing of Step S302 is the same as in Step S102 of FIG. 6.

After that, the control unit 14 executes processing of determining the content of the audio output control to be executed in the main processing (S303 to S308). In this processing, an audio data table stored in the optical disc 36 is referred to.

FIG. 14 is a diagram illustrating an example of the audio data table. The audio data table illustrated in FIG. 14 contains fields of "ID", "audio data", and "situation". The "audio ID" field indicates identification information (audio ID) for uniquely identifying audio data. The "audio data" field indicates the audio data itself. The "situation" field indicates a situation in which the audio data is to be output. When the current situation of the game has become a situation indicated in the "situation" field, the audio data identified by the "audio ID" or "audio data" field is output. Note that the audio data managed by the audio data table is not limited to play-by-play audio data, and also includes, for example, sound effect data and game music data.

First, the control unit 14 initializes the value of a variable i to 1 (S303). Then, the control unit 14 determines whether or not the current situation of the game has become a situation in which an i-th item of audio data among the items of audio data managed by the audio data table is to be output (S304). For example, when the audio ID of the i-th item of audio data is "2", it is determined whether or not a shot has been made.

If it is determined that the current situation of the game has become a situation in which the i-th item of audio data is to be output, the control unit 14 additionally stores instruction data for giving an instruction to output the i-th item of audio data (output instruction data) in the primary queue for the instruction data (S305). For example, the instruction data contains the audio ID of the i-th item of audio data and information indicating how that item of audio data is to be output (for example, sound level).

The primary queue for the instruction data is a queue for storing the instruction data, and is provided to the main memory 16. FIG. 15 is a schematic diagram illustrating an example of the primary queue. In FIG. 15, "audio ID: 3, sound level: 10, . . . " represents such instruction data that gives an instruction to output audio data whose audio ID is "3" with the sound level set to "10".

After that, the control unit 14 determines whether or not the i-th item of audio data is the last item of audio data among the items of audio data managed by the audio data table (S306). Then, if the i-th item of audio data is not the last item of audio data, the control unit 14 adds 1 to the variable i (S307), and executes the processing from Step S304 again.

On the other hand, if the i-th item of audio data is the last item of audio data, that is, if the processing of from Step S304 to Step S305 is completed for all the items of audio data managed by the audio data table, the control unit 14 additionally stores the content of the primary queue for the instruction data in a secondary queue for the instruction data (S308). In this case, the content of the primary queue is deleted.

The secondary queue for the instruction data is a queue for storing the instruction data, and is provided in the main memory 16. FIG. 16 is a schematic diagram illustrating an example of the secondary queue. The secondary queue retains the content of the primary queue obtained when the execution of the game processing is completed. In the example illustrated in FIG. 16, a content ($Q[TA_{n-1}]$) of the primary queue, which is obtained when the execution of the game processing starting at the time $TA_{n-1}$ is completed, and a content ($Q[TA_n]$) of the primary queue, which is obtained when the execution of the game processing starting at the time $TA_n$ is completed, are retained.

Figure 17:
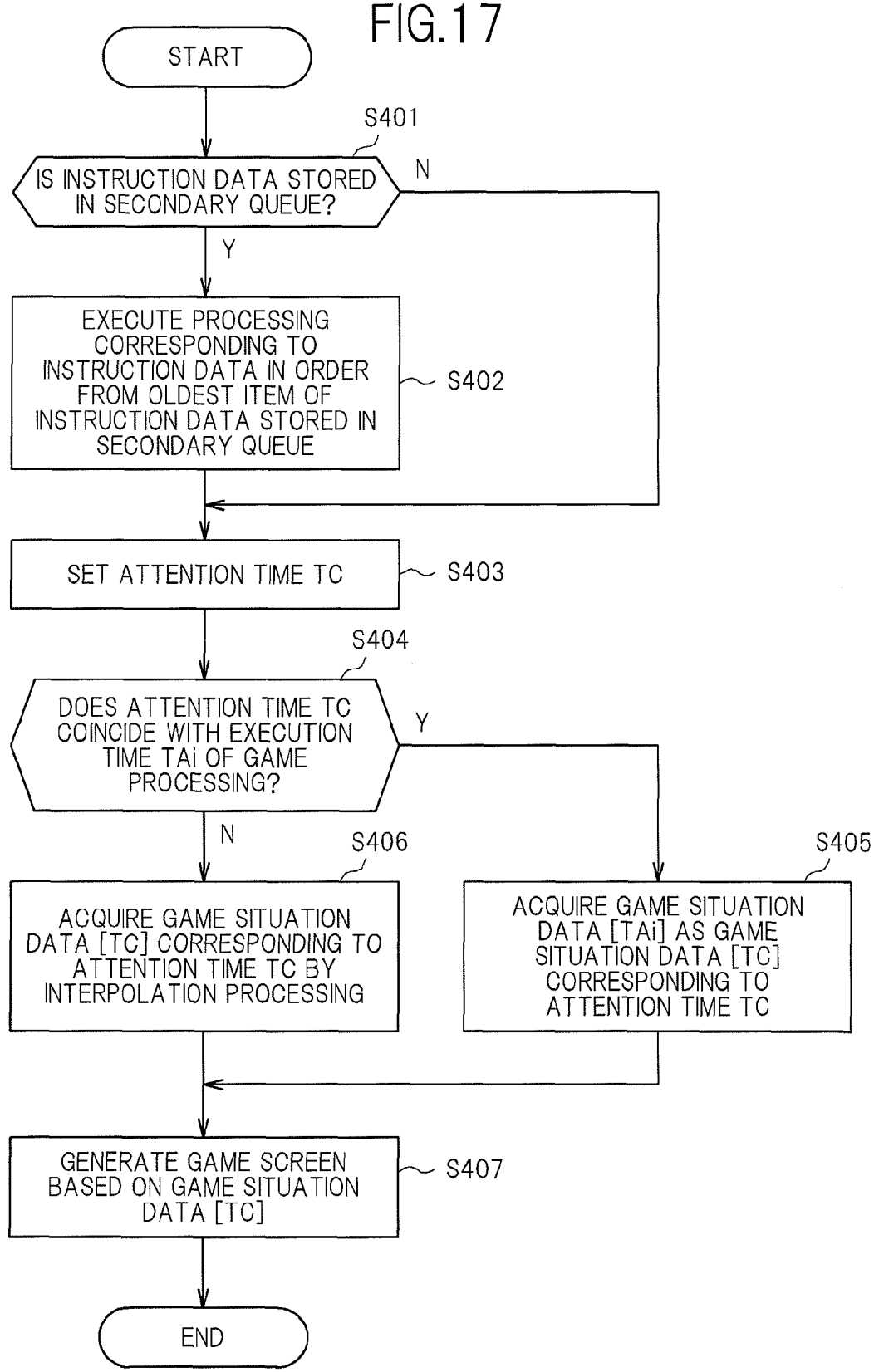
[FIG. 17] A flow chart illustrating an example of main processing.

Next, the main processing is described in detail. FIG. 17 is a flow chart illustrating an example of the main processing executed at the times $TB_0$ to $TB_5$, $TB_{m-1}$, $TB_m$, $TB_{n-1}$, $TB_n$, and the like. The main processing illustrated in FIG. 17 is executed every second time period (IB). For example, when the system of the television set serving as the display unit 32 is the NTSC system, the second time period (IB) is $\frac{1}{60}^{th}$ of a second, and when the system of the television set serving as the display unit 32 is the PAL system, the second time period (IB) is $\frac{1}{50}^{th}$ of a second.

As illustrated in FIG. 17, the control unit 14 determines whether or not the instruction data is stored in the secondary queue for the instruction data (S401). If the instruction data is stored in the secondary queue, the control unit 14 executes processing corresponding to the instruction data in order from the oldest item of instruction data stored in the secondary queue (S402).

For example, when the secondary queue is in the state illustrated in FIG. 16, first, processing corresponding to the instruction data is executed in order from the oldest item of instruction data of the content $Q[TA_{n-1}]$. After that, processing corresponding to the instruction data is executed in order from the oldest item of instruction data of the content $Q[TA_n]$. Note that, when the processing corresponding to the instruction data is completed, the corresponding instruction data is deleted from the secondary queue.

Accordingly, when the secondary queue is in the state illustrated in FIG. 16, first, the instruction data of "audio ID: 8, sound level: 5, . . . " is read from the secondary queue, and the control unit 14 (and the audio processing unit 22) causes (cause) the audio output unit 34 to output audio data whose audio ID is "8" with the sound level set to "5". Then, after that, "audio ID: 8, sound level: 5, . . . " is deleted from the secondary queue.

After the processing of Step S402 is executed, the control unit 14 executes processing of from S403 to S407. Note that if the instruction data is not stored in the secondary queue (S401: N), the processing of from Step S403 to Step S407 is executed without executing the processing of Step S402. The processing of from Step S403 to Step S407 is the same as the processing of from Step S201 to Step S205 of FIG. 9, and hence description of the processing of from Step S403 to Step S407 is herein omitted.

Figure 18:
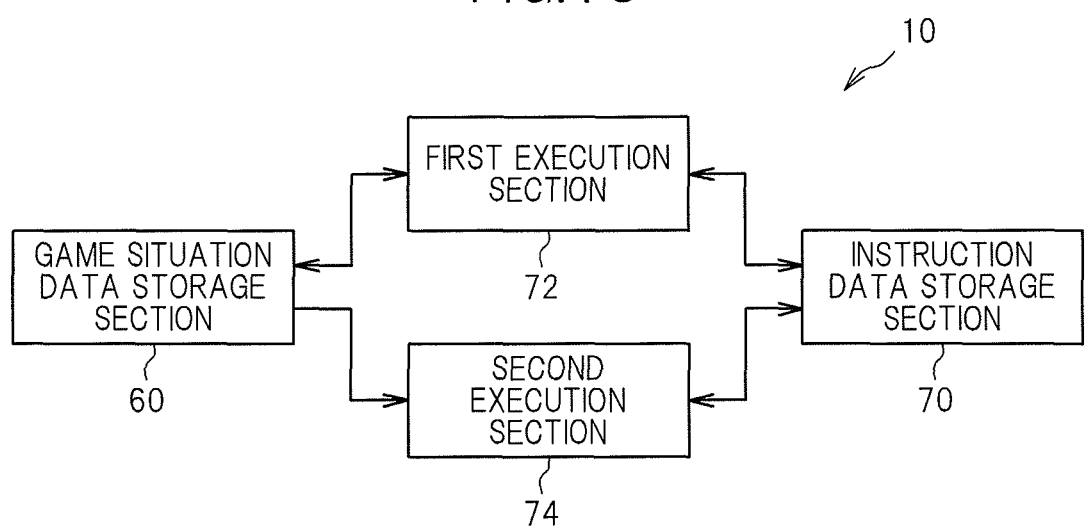
[FIG. 18] A functional block diagram illustrating functions to be implemented in a game device according to a second embodiment.

Next, description is given of functions to be implemented in the game device 10 according to the second embodiment. FIG. 18 is a functional block diagram mainly illustrating, of the functions to be implemented in the game device 10 according to the second embodiment, functions relevant to the present invention. As illustrated in FIG. 18, the game device 10 includes a game situation data storage section 60, an instruction data storage section 70, a first execution section 72, and a second execution section 74.

The game situation data storage section 60 and the instruction data storage section 70 are implemented mainly by, for example, the main memory 16. The first execution section 72 and the second execution section 74 are implemented mainly by, for example, the control unit 14. For example, the first execution section 72 is implemented by the control unit 14 executing the game processing illustrated in FIG. 13. Further, for example, the second execution section 74 is implemented by the control unit 14 executing the main processing illustrated in FIG. 17.

The function of the game situation data storage section 60 is the same as in the first embodiment. Hence, description thereof is herein omitted.

When the first execution time (for example, times $TA_0$ to $TA_5$, $TA_{n-1}$, and $TA_n$: see FIGS. 4 and 5), which comes every first time period (IA: see FIGS. 4 and 5), has been reached, the first execution section 72 generates the game situation data indicating the situation of the game. The function of the first execution section 72 is the same as the function of the game situation data generating section 62 according to the first embodiment.

In the second embodiment, when the first execution time has been reached, the first execution section 72 executes generation processing, in which the game situation data is generated, and determination processing, in which the content of the output control to be executed by the second execution section 74 is determined based on the game situation data. Here, examples of the "output" include "audio output" for causing the audio output unit 34 to output the audio data, and "vibration output" for causing the controller 30 to vibrate.

Further, the first execution section 72 causes the instruction data storage section 70 to store the instruction data (output instruction data) for instructing the second execution section 74 to execute the output control having the content determined in the above-mentioned determination processing. In this embodiment, the secondary queue for the instruction data (see FIG. 16) corresponds to the instruction data storage section 70.

For example, when the above-mentioned generation processing and determination processing are completed, the first execution section 72 causes the instruction data storage section 70 to store the instruction data. In other words, the first execution section 72 awaits causing the instruction data storage section 70 to store the instruction data until the above-mentioned generation processing and determination processing are completed.

When the second execution time (for example, times $TB_0$ to $TB_5$, $TB_{m-1}$, $TB_m$, $TB_{n-1}$, and $TB_n$: see FIGS. 4 and 5), which comes every second time period (IB: see FIGS. 4 and 5), has been reached, the second execution section 74 executes the output control regarding the game.

For example, when the second execution time has been reached, the second execution section 74 (game screen updating means) updates the game screen based on the game situation data [TC] corresponding to the attention time TC, which comes the predetermined time period before the second execution time. The function of the second execution section 74 is the same as the function of the game screen updating section 64 according to the first embodiment.

Specifically, the second execution section 74 (game situation data acquiring means) acquires the game situation data [TC] corresponding to the attention time TC by executing the interpolation processing based on the first game situation data corresponding to a time which comes before the attention time TC and the second game situation data corresponding to a time which comes after the attention time TC. Then, the second execution section 74 updates the game screen based on the game situation data [TC] corresponding to the attention time TC.

In the second embodiment, the second execution section 74 executes the output control based on the instruction data (output instruction data) stored in the instruction data storage section 70.

In the second embodiment described above, the game processing and the main processing are executed by separate threads. In the second embodiment, in particular, owing to the existence of the configuration regarding the instruction data storage section 70, the processing of determining the content of the output control based on the game situation (part of the game processing) and the processing of executing the output control having the thus determined content (part of the main processing) can be executed by separate threads. As described in the first embodiment as well, by executing the game processing and the main processing by separate threads, the processing speed can be improved.

Note that in the game processing (see FIG. 13), for example, during a period between Step S307 and Step S308, it may be determined whether or not the current situation of the game has become a situation in which the controller 30 is to be vibrated. Then, if it is determined that the current situation of the game has become a situation in which the controller 30 is to be vibrated, instruction data for giving an instruction to vibrate the controller 30 may be additionally stored in the primary queue. Further, in this case, the instruction data may contain information indicating the degree (strength) of vibration.

In this case, in the main processing (see FIG. 17), when the instruction data for giving an instruction to vibrate the controller 30 is stored in the secondary queue, in Step S402, the control unit 14 causes the controller 30 to vibrate.

Further, in the game processing (see FIG. 13), for example, during the period between Step S307 and Step S308, it may be determined whether or not the current situation of the game has become a situation in which data is to be read from the optical disc 36 into the main memory 16. Then, when it is determined that the current situation of the game has become a situation in which data is to be read from the optical disc 36 into the main memory 16, the instruction data for giving an instruction to read data (reading instruction data) may be additionally stored in the primary queue.

In this case, in the main processing (see FIG. 17), when the reading instruction data is stored in the secondary queue, in Step S402, the control unit 14 executes the reading of data. Then, when the reading of data is completed, the control unit 14 deletes the corresponding reading instruction data from the secondary queue. With this configuration, in the game processing (see FIG. 13), the control unit 14 can determine that the reading of data is completed by detecting that the reading instruction data has been deleted from the secondary queue. Then, when it is determined that the reading of data is completed, the control unit 14 can execute processing using that data.

Further, in the main processing (see FIG. 17), instead of the processing of from Step S403 to Step S407, processing of generating the game screen based only on the latest game situation data may be executed. Specifically, when the second execution time has been reached, the second execution section 74 may update the game screen based only on the latest game situation data obtained at that time point. Further, in this case, only the latest game situation data may be stored in the game situation data storage section 60.

Even with this configuration, the processing of determining the content of the output control based on the game situation (part of the game processing) and the processing of executing the output control having the thus determined content (part of the main processing) can be executed by separate threads. That is, the game processing and the main processing can be executed by separate threads. As a result, the processing speed can be improved.

Note that, similarly to the game screen updating section 64 according to the first embodiment, if the second execution section 74 is configured to update the game screen based on the game situation data [TC] at the attention time TC, it is possible to reduce the workload of the game developer and prevent the user from having a feeling of unease (strangeness), as in the first embodiment.

Note that the present invention is not limited to the embodiments described above.

(1) For example, the game space 40 may be a virtual two-dimensional space. Specifically, the position, the posture, the moving direction, etc. of a player character or a ball may be managed by two coordinate elements.

(2) Further, for example, the present invention is also applicable to another sports game instead of the soccer game. For example, the present invention is also applicable to a basketball game, an American football game, or a baseball game, which is played using a ball (moving object), or an ice hockey game that is played using a puck (moving object).

Further, the present invention is also applicable to another game instead of the sports game. For example, the present invention is applicable to a role playing game, an action game, and such other games, in which one or a plurality of game characters act in a game space. Note that the game situation data used in this case contains data indicating the state(s) (for example, position, orientation, posture, or type of action) of one or a plurality of game characters.

Further, the present invention is also applicable to a network game executed via a communication network.

The invention claimed is:

1. A game device, comprising:
   first execution means for executing generation of game situation data indicating a situation of a game in the case where a first execution time which comes every first time period is reached;
   game situation data storage means for storing a plurality of items of the game situation data generated by the first execution means; and
   second execution means for executing output control regarding the game in the case where a second execution time which comes every second time period is reached,
   wherein the second execution means comprises game screen updating means for updating, in the case where the second execution time is reached, a game screen based on game situation data corresponding to an attention time which comes a predetermined time period before the second execution time,
   wherein the game situation data storage means stores at least first game situation data corresponding to a time which comes before the attention time and second game situation data corresponding to a time which comes after the attention time, and
   wherein the game screen updating means comprises:
      game situation data acquiring means for acquiring the game situation data corresponding to the attention time by executing interpolation processing based on the first game situation data and the second game situation data; and
      means for updating the game screen based on the game situation data acquired by the game situation data acquiring means.

2. The game device according to claim 1,
   wherein the first execution means comprises:
      means for executing, in the case where the first execution time is reached, generation processing of generating the game situation data and determination processing of determining, based on the situation of the game, a content of the output control to be executed by the second execution means; and
      means for causing instruction data storage means to store output instruction data for instructing the second execution means to execute the output control having the content determined in the determination processing, and
   wherein the second execution means comprises means for executing the output control based on the output instruction data stored in the instruction data storage means.

3. The game device according to claim 2, wherein the first execution means comprises means for causing the instruction data storage means to store the output instruction data in the case where the generation processing and the determination processing are completed.

4. The game device according to claim 2,
   wherein the second execution means executes the output control regarding the game and reading of data regarding the game in the case where the second execution time is reached,
   wherein the first execution means comprises:
      means for executing, in the case where the first execution time is reached, the generation processing, the determination processing, and processing of determining whether or not to cause the second execution means to execute the reading of the data; and
      means for, in the case where it is determined that the second execution means is to be caused to execute the reading of the data, causing the instruction data storage means to store reading instruction data for instructing the second execution means to execute the reading of the data,
   wherein the second execution means comprises:
      means for starting the reading of the data in the case where the reading instruction data is stored in the instruction data storage means; and
      means for deleting the reading instruction data from the instruction data storage means in the case where the reading of the data is completed, and
   wherein the first execution means determines that the reading of the data is completed in the case where the reading instruction data is deleted from the instruction data storage means.

5. A method of controlling a game device including at least one microprocessor, the method comprising:

generating, by the at least one microprocessor, game situation data indicating a situation of a game in the case where a first execution time which comes every first time period is reached;

reading storage content of a game situation data storage that stores a plurality of items of the generated game situation data; and executing, by the at least one microprocessor, output control regarding the game in the case where a second execution time which comes every second time period is reached, wherein executing the output control comprises updating, in the case where the second execution time is reached, a game screen based on game situation data corresponding to an attention time which comes a predetermined time period before the second execution time, wherein the game situation data storage stores at least first game situation data corresponding to a time which comes before the attention time and second game situation data corresponding to a time which comes after the attention time, and wherein updating the game screen comprises:
acquiring step of acquiring the game situation data corresponding to the attention time by executing interpolation processing based on the first game situation data and the second game situation data; and
updating the game screen based on the acquired game situation data.

6. A non-transitory computer-readable information storage medium storing a program for causing a computer to function as a game device, the program further causing the computer to perform steps of:

executing generation of game situation data indicating a situation of a game in the case where a first execution time which comes every first time period is reached;

referring to a storage content of game situation data storage that stores a plurality of items of the generated game situation data; and executing output control regarding the game in the case where a second execution time which comes every second time period is reached, wherein executing the output control comprises updating, in the case where the second execution time is reached, a game screen based on game situation data corresponding to an attention time which comes a predetermined time period before the second execution time, wherein the game situation data storage stores at least first game situation data corresponding to a time which comes before the attention time and second game situation data corresponding to a time which comes after the attention time, and wherein updating the game screen comprises:
acquiring the game situation data corresponding to the attention time by executing interpolation processing based on the first game situation data and the second game situation data; and
updating the game screen based on the acquired game situation data.

7. A game device comprising:

a first execution section that generates game situation data indicating a situation of a game in the case where a first execution time which comes every first time period is reached; and a second execution section that controls output of the game in the case where a second execution time which comes every second time period is reached; and a game situation data storage that stores a plurality of items of the game situation data generated by the first execution section;

wherein the second execution section comprises a game screen updating section that read items of the game situation data from the game situation data storage and updates, in the case where the second execution time is reached, a game screen based on game situation data corresponding to an attention time which comes a predetermined time period before the second execution time, wherein the game situation data storage stores at least first game situation data corresponding to a time which comes before the attention time and second game situation data corresponding to a time which comes after the attention time, wherein the game screen updating section comprises a game situation data acquiring section that reads the at least first game situation data and second game situation data from the game situation data storage and acquires the game situation data corresponding to the attention time by executing interpolation processing based on the first game situation data and the second game situation data, and the game screen updating section updates the game screen based on the game situation data acquired by the game situation data acquiring section.

* * * * *